No. 847,572. PATENTED MAR. 19, 1907.
B. M. W. HANSON.
FLUID ACTUATED CLUTCH.
APPLICATION FILED MAR. 3, 1905.
2 SHEETS—SHEET 1.
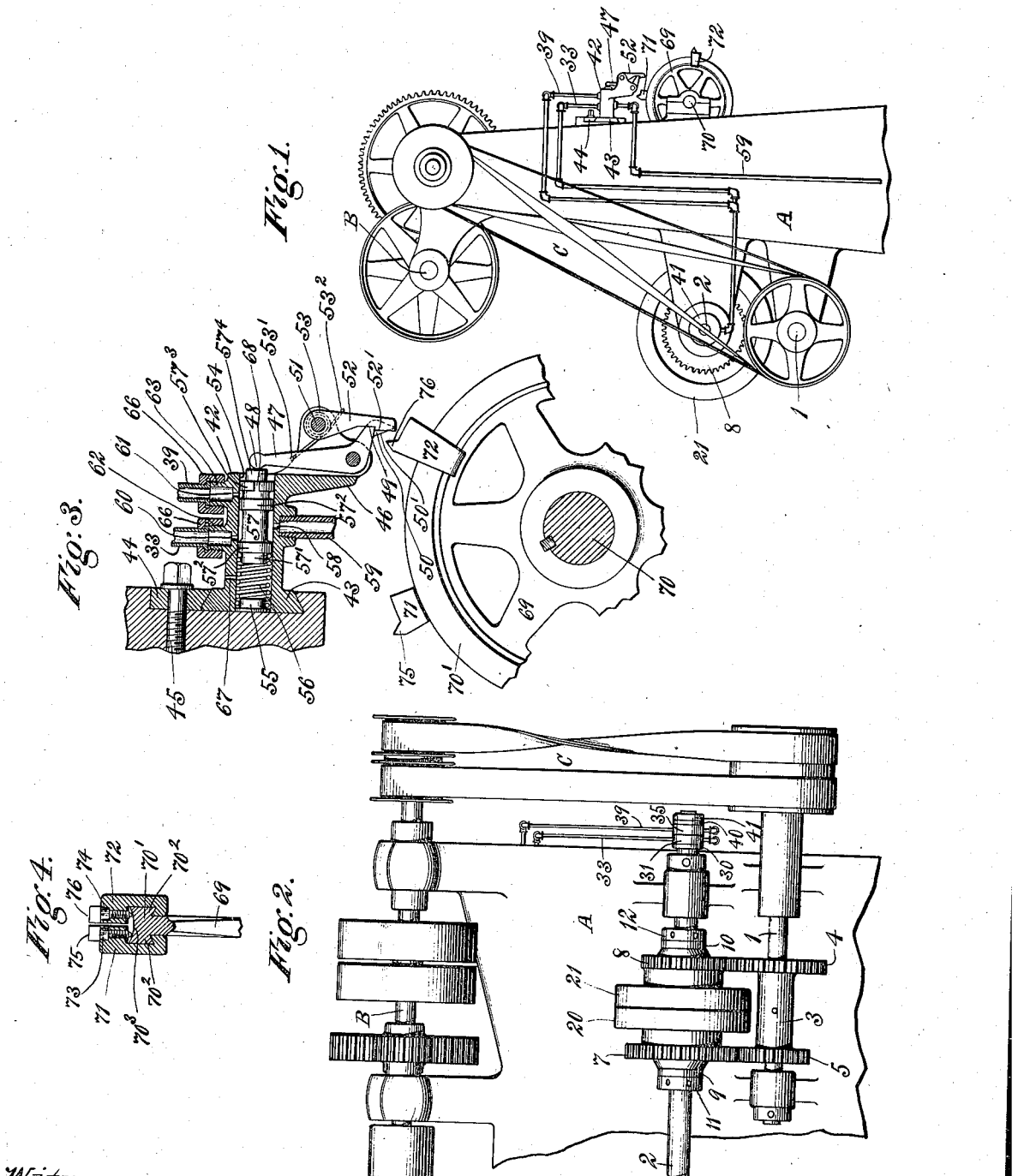
Witnesses:
F. E. Anderson
Frances E. Blodgett.
Inventor:
B. M. W. Hanson,
By his Attorney,

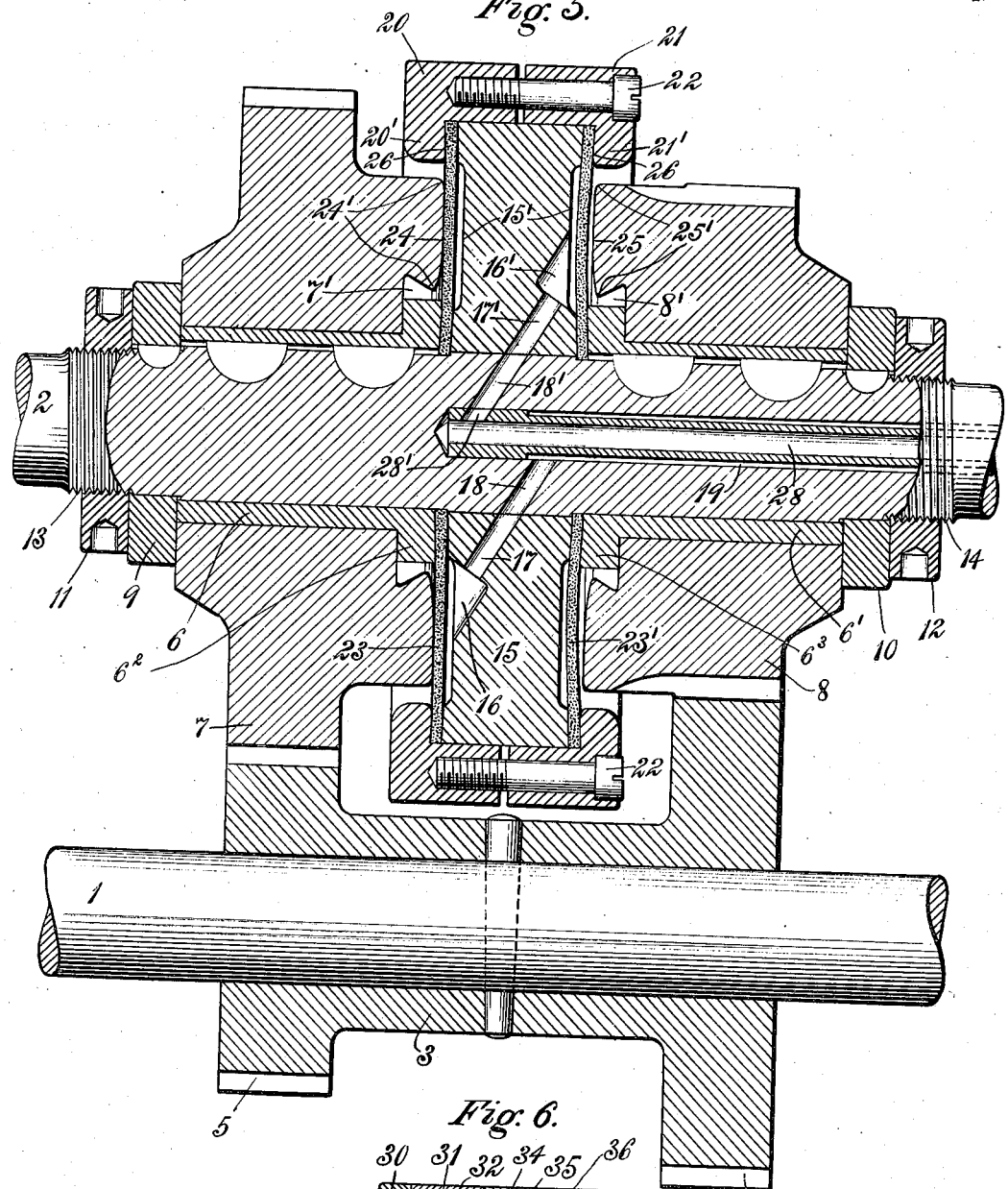

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

FLUID-ACTUATED CLUTCH.

No. 847,572.     Specification of Letters Patent.     Patented March 19, 1907.

Application filed March 3, 1905. Serial No. 248,231.

*To all whom it may concern:*

Be it known that I, BENGT M. W. HANSON, a citizen of Sweden, residing at Hartford, in the county of Hartford and State of Connecticut, have invented certain new and useful Improvements in Fluid - Actuated Clutches, of which the following is a specification.

This invention relates to clutches, and more particularly to devices of the character mentioned in which fluid under pressure—for instance, compressed air—is utilized as the motive fluid for actuating the clutch and connecting it to the element to be driven.

Primarily the object of the invention is the provision of a clutch embodying an element forced to its work by fluid under pressure.

A further object of the invention is the provision of a carrier rigid with the shaft, an element to be driven loose on said shaft, and a movable element connected to the carrier and operated by fluid-pressure to cause it to attach said loose element to the carrier or to release it therefrom.

A further object of the invention is the provision of a shaft having passages for the admission of fluid, a carrier rigid with the shaft and having passages communicating with those of said shaft, and a flexible disk or disks, of leather, rubber, or other suitable material, adapted to be distended by fluid-pressure and to lock an element loose on the shaft to said carrier, so that it will be driven by said carrier.

Other objects of the invention will be set forth in the following description.

Figure 1 is an end elevation of a form of machine with which my invention may be employed. Fig. 2 is a side elevation of such a machine. Fig. 3 is a longitudinal vertical section of a valve, showing the means for actuating said valve in elevation. Fig. 4 is a section on line 4 4 of Fig. 3. Fig. 5 is a longitudinal vertical section showing the improved clutch; and Fig. 6 is a similar view of the shaft to which the clutch-disk or carrier is attached, showing the fluid-pressure connections.

Like numerals designate similar parts throughout the several views.

Referring to the drawings, the numeral 1 designates a shaft, and 2 a driven shaft, both journaled in framework A, of any desired description. Mechanism of any desired kind may be utilized for actuating the shaft 1 from a shaft B—for instance, the belt-gearing designated in a general way by C in Figs. 1 and 2.

Upon the shaft 1 is keyed or otherwise rigidly fastened a sleeve 3, carrying at one end a large gear 4 and at its opposite extremity a smaller gear 5. It is, however, immaterial whether the gears 4 and 5 form part of a sleeve, as shown, or are connected in other ways to the shaft 1.

Keyed to the driven shaft 2 are bushings 6, having flanged inner ends $6^2$ $6^3$, and upon the bushing 6 is loosely mounted a large gear 7 in engagement with the small gear 5 of shaft 1, while on the bushing 6' is also loosely mounted a smaller gear 8 in engagement with the large gear 4 of the shaft 1. Collars 9 and 10 on the shaft prevent displacement of the gear-wheels 7 and 8, and said collars are held in place by nuts 11 and 12 engaging threaded parts 13 and 14 of said shaft, as shown in Fig. 5. Rigid with the shaft intermediate the flanged inner ends of the bushings is a carrier or clutch-disk 15, the sides of said carrier being circumferentially grooved at 15', respectively, to form passage-ways for fluid under pressure, as hereinafter described. Leading from said grooves are chambers 16 16', respectively, and in the body of the disk 15 are passages 17 17', respectively, communicating with said chambers, registering with passages 18 18' in the shaft 2, and opening into a longitudinal bore 19 thereof. Clamping - rings 20 21, having circumferential flanges 20' 21', are secured to the carrier 15 by screw-bolts 22. Disks or diaphragms 23 23', of leather or other suitable material, are clamped to the clutch-disk or carrier 15 by the flanges 20' 21'.

To receive the flange $6^2$ of bushing 6, the gear-wheel 7 is grooved on its inner side, as at 7', and this results in an overhanging straight circumferential bearing-face 24, having, preferably, rounded ends 24'. Against said bearing-face 24 the disk 23 is forced by the fluid when admitted through the chamber 16 and conduits 17 18, as will be hereinafter described.

Like gear-wheel 7, the gear-wheel 8 is provided with a groove 8' to receive the flange $6^3$ of bushing 6' and is provided with a straight bearing-face 25, having rounded ends 25', said bearing-face being engaged by the disk 23' when fluid under pressure is admitted to the chamber 16' through the passages 17' 18'.

Each disk 23 23' is clamped against inclined bearing-faces 26 of the circumferential flanges 20' 21', the result being that the disk is placed under tension and normally tends to spring inward and assume a bowed form when not in contact with the bearing-face of the gear-wheel with which it coöperates, as shown by the disk 23' at the right of carrier 15 in Fig. 2. When, however, pressure is applied to either disk, it is straightened with a toggle-like action and is forced snugly into contact with the bearing-face of the gear-wheel, thereby locking said gear-wheel to the carrier 15. Cutting and fracture of the disks are prevented by the rounded corners of the bearing-faces, and a full flat bearing of the disk against its bearing-face is the result of the construction above described, as clearly shown in Fig. 2.

For delivering motive fluid under pressure to the passages 17 17' and chambers 16 16' any desired connections may be employed, and I have shown for this purpose a bore 19 in shaft 2, communicating with the passage 18, and a tube 28, inserted in said bore and having a port 28' registering with the passage 18'.

Keyed to the shaft 2 and mounted on a reduced end 29 thereof is a collar 30, and adjacent to said collar and loose on the shaft is an annulus 31, having a circumferential groove 32 in its inner wall. For supplying fluid to said groove a pipe 33 is threaded into the annulus and communicates with the groove thereof, a port 34 constituting a passage from said groove to the bore 19 of the shaft 2 and said pipe locking the annulus against rotation with the shaft. Adjacent to the annulus 31 is a second loose annulus 35, having an inner circumferential groove 36 communicating by a port 37 in shaft 2 with a port 38 in the head $28^2$ of tube 28. A pipe 39 is threaded into the annulus 35 and conveys fluid to the groove 36 thereof. To secure the annuli 31 35 to the reduced end of the shaft, a collar 40 bears against the annulus 35 and a split-nut 41 is threaded on the end of the shaft and bears against said collar. For regulating the supply of fluid to the conduits 33 39 any desired means may be employed, and I have shown for this purpose a piston-valve now to be described.

Designated by 42 is a valve-casing having a dovetailed base 43, by which it is secured to the framework of the machine and held in place by a gib 44 and bolt 45. A slotted hanger 46 depends from the valve-casing, and in said hanger is pivoted an angle-lever 47, the longer arm of which has an obtuse upper end 48, while the short arm is inclined or beveled at 49 to form a catch-surface and below said catch-surface has an extension 50, provided with an inclined inner wall 50'. Journaled in the hanger is a shaft 51, carrying an arm 52, the free end of which has a latching-shoulder 52', adapted to snap over the catch-surface 49 and to lock the lever 47 when the same is rocked to throw its long arm inward. A torsion-spring 53 surrounds the shaft 51, and one terminal 53' of said spring bears against the hanger 46 and the other terminal $53^2$ against the latch-arm 52, said spring serving normally to throw the latch to its locking position.

In the valve-casing 42 is a longitudinal bore 54, and in said bore are fitted a plug 55, a coiled spring 56, and a piston-valve 57, the latter having a reduced portion 57' entering the spring and also having collars $57^2$, a slotted collar $57^3$, and a reduced outer end $57^4$, against which the end of the long arm of lever 47 bears. In the valve-casing are an induction-port 58, communicating with a fluid-supply conduit 59, and eduction-ports 60 and 61, registering with the discharge-pipes 33 and 39, the latter being held on the chambered nipples 62 and 63 by couplings 66. An exhaust-port 67 is formed in the casing, and a like port 68 is provided in the collar $57^3$.

For operating the valve-controlling lever 47 and its latch any desired mechanism may be employed, or said parts may be actuated by hand, if desired. Among other devices which may be employed for this purpose are the following, viz: Designated by 69 is a carrier, which may be of any suitable kind, but is shown as of wheel shape, and said carrier is secured to a rotary shaft 70, which may constitute an element of an automatic machine in which the improved clutch is employed. This wheel is provided with a rim 70', having lateral undercut extensions $70^2$ and a concave top $70^3$. Shoes 71 and 72, each shaped on its under side to fit the undercut extensions $70^2$, are clamped to the rim of the wheel by screws 73 and 74, respectively, or in other desired ways, and the points of said screws enter the concave top $70^3$ and by bearing against the same serve adjustably to clamp said shoes at the desired distance apart to the rim of the carrier and to prevent them from displacement thereon. Beveled cam-dogs 75 and 76 are carried by the respective shoes, and these dogs actuate the lever 47 and latch-arm 52 in a manner presently to be described.

In the present invention it is necessary to actuate the clutch-disks 23 23' when it becomes necessary to impart different speeds to the shaft 2, and the conduits 33 39 are employed to convey the motive fluid to the passages leading to said disks.

As evident, the spring 56 normally tends to throw the piston-valve outward, and the latch-lever 52 must be tripped to permit of this action. This tripping movement of the latch-lever is accomplished by the dog 76 of shoe 72, which dog as its carrier rotates strikes the end of said latch-lever and forces the same backward against the action of the spring 53. In this position of the valve fluid from pipe 59 passes through the valve-casing and port 61 thereof to the pipe 39, enters the circular passage 36 in collar 35, and through the port 29 is conveyed to the tube 28, and leaving said tube by the port 28' it enters passages 18' 17' and chamber 16' of the carrier 15 and exerts its force to drive the disk 23' against the bearing-face of gear 8, thus clutching said gear to the carrier and causing the shaft 2 to be driven at high speed. After the period during which it is necessary to drive the shaft 2 at high speed has expired the piston-valve must be returned, and this is accomplished by the dog 75 of shoe 71, which as its carrier rotates will strike the inclined lower end of the latch-lever 47 and will cause said lever to force the valve inward against the tension of spring 56, thereby diverting the pressure fluid to the pipe 33. As the upper end of said lever 47 is pushed inward the shoulder or latch of the lever 52 snaps behind the catch on said lever 47 and locks said lever until again released in the manner above described. When thrown inward, as just described, the piston-valve permits the passage of fluid through port 60 to pipe 33, from which it enters the groove 32 of collar 31 and passes through the port 34 into the bore 19 of shaft 2, and emerging from said bore it travels through the passages 18 17 and chamber 16 and exerts its force to drive the flexible disk 23 against the bearing-surface 24 of gear 7, thus locking said gear to the carrier 15 and imparting a slower movement of rotation to the shaft 2. As one flexible clutch-disk is advanced the other is released and immediately assumes a bowed form, as shown by Fig. 5, the exhaust escaping through the passages described and the ports in the valve-casing and on the valve, according to the position of said disks.

By adjusting the shoes 71 and 72 along the wheel-rim the valve may be actuated at any desired time to control the movement of the clutch-disks with reference to the gear-wheels with which they are to be alternately engaged.

No claim is herein made to the valve and its operating mechanism, for said devices constitute the subject-matter of my application filed December 19, 1904, Serial No. 237,543.

While a certain form of machine is illustrated for the purpose of showing an embodiment of the invention, it is distinctly to be understood that the invention relates to clutches generally and is limited to no specific art.

Changes may be made in many details of the construction described, and a flexible clutch of any suitable material may be substituted for that shown without departure from the invention. So, too, the arrangements of gearing with which the clutch coöperates and of the pipes and passages through which the motive fluid is conveyed may be modified within wide limits and still be within the purview of the invention.

Having thus described my invention, what I claim is—

1. The combination, with an element having a clutch-surface, of a shaft; a carrier rigid with the shaft; a flexible clutch element; means for securing said flexible clutch element to the carrier so that it will assume a buckled form; and means for forcing the flexible element to engage the other clutch element.

2. The combination, with a rotary shaft, of a carrier rigid with said shaft; a flexible clutch element secured to the carrier so that it will assume a buckled form; an element loose on the shaft; and means for forcing the buckled flexible clutch element to engage the other element.

3. The combination, with a rotary shaft having passages for receiving fluid, of a carrier rigid with the shaft, and having a passage communicating with one of the passages in the shaft; a buckled diaphragm secured to the carrier; an element with which said diaphragm is adapted to engage; and means for supplying fluid to said shaft.

4. The combination, with a rotary shaft, of a carrier rigid with the shaft; buckled, flexible clutch elements secured to the carrier; driven elements loose on the shaft, and each having a clutch-surface; and means for forcing either flexible clutch element to engage the driven element with which it coöperates.

5. The combination, with a shaft having passages to receive fluid under pressure, of means for controlling the supply of fluid to said shaft; a carrier rigid with the shaft, and having a passage registering with one of those in the shaft; a buckled diaphragm secured to the carrier; and an element having a clutch-surface with which said diaphragm may be engaged.

6. The combination, with a rotary shaft having a bore and a passage leading from said bore, of a carrier rigid with the shaft, and having a passage; a buckled flexible diaphragm; an element with which said diaphragm is adapted to engage; and means for supplying fluid under pressure to said bore.

7. The combination, with a rotary shaft having a bore and a passage leading from said bore, of a carrier rigid with the shaft, and having a passage; a buckled flexible diaphragm; an element with which said diaphragm is adapted to engage; means for supplying fluid under pressure to said bore; and a valve for controlling the supply of said fluid.

8. The combination, with a rotary shaft having a bore and a passage leading from said bore, of a carrier rigid with the shaft, and having a passage; a buckled flexible diaphragm; an element with which said diaphragm is adapted to engage; means for supplying fluid under pressure to said bore; a valve for controlling the supply of said fluid; and means for actuating said valve.

9. In a clutch, the combination, with a rotary carrier, of a flexible diaphragm; means for securing said diaphragm to the carrier so that it will assume a buckled form; an element coöperating with the diaphragm and carrier, and having an engaging surface for the diaphragm; and means for supplying fluid under pressure, and for conveying it to a point where it will act against the buckled diaphragm.

10. The combination, with a shaft, of a pair of driven elements loose on said shaft; a carrier rigid with the shaft intermediate said elements; flexible diaphragms means for securing said diaphragms to the sides of the carrier so that they normally assume a bowed form; and means for alternately connecting said diaphragms with said driven elements.

11. The combination, with a carrier of a diaphragm secured thereto so that it will normally assume a buckled form; a clutch element with which the diaphragm may be engaged; and means for forcing the diaphragm against the clutch element.

12. The combination, with a rotary shaft, of a carrier rigid with said shaft; a clamping-ring having an inclined surface; a diaphragm secured to the carrier by said clamping-ring so that it will assume a buckled form; means for distending the diaphragm; and a clutch element with which the diaphragm may be engaged.

13. The combination, with a rotary carrier having an inclined surface, of a clamp also having an inclined surface; a flexible diaphragm secured to the carrier by the clamp so that it will normally assume a bowed form; a clutch element with which the diaphragm may engage; and means for distending said diaphragm and forcing it into straight engagement with said clutch element.

14. The combination, with a rotary carrier, of a flexible diaphragm secured thereto; a driven element having a rounded edge surface and a flat clutch-surface; and means for forcing the diaphragm against the flat clutch-surface.

15. The combination, with a rotary carrier having inclines on its sides, of clamping-rings fitted to the carrier and having inclined circumferential flanges; diaphragms attached to the sides of the carrier by said clamping-rings; means for alternately distending said diaphragms; and driven elements having clutch-surfaces adapted to be engaged by the diaphragms.

16. The combination, with a rotary shaft, of a carrier rigid therewith; flexible diaphragms; rings having inclined surfaces for securing said diaphragms to the carrier; fluid-pressure devices for distending the diaphragms; and exhaust devices for relieving pressure on one diaphragm when the other diaphragm is distended.

In testimony whereof I affix my signature in presence of two witnesses.

BENGT M. W. HANSON.

Witnesses:
N. S. BATES,
E. C. BENEDICT.